United States Patent
Lu

(10) Patent No.: US 11,585,359 B2
(45) Date of Patent: Feb. 21, 2023

(54) FIXING DEVICE

(71) Applicants: Inventec (Pudong) Technology Corporation, Shanghai (CN); INVENTEC CORPORATION, Taipei (TW)

(72) Inventor: Kuo-Jui Lu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/344,945

(22) Filed: Jun. 11, 2021

(65) Prior Publication Data
US 2022/0290704 A1 Sep. 15, 2022

(30) Foreign Application Priority Data
Mar. 15, 2021 (CN) .......................... 202110275779.8

(51) Int. Cl.
*F16B 2/22* (2006.01)

(52) U.S. Cl.
CPC ..................... *F16B 2/22* (2013.01)

(58) Field of Classification Search
CPC ........................................................ F16B 2/22
See application file for complete search history.

(56) References Cited

U.S. PATENT DOCUMENTS

| 8,289,690 | B2 * | 10/2012 | Chang | ..................... G06F 1/186 361/752 |
| 10,455,720 | B2 * | 10/2019 | Lu | ......................... H05K 7/1402 |
| 2016/0330856 | A1 | 11/2016 | Ma et al. | |

FOREIGN PATENT DOCUMENTS

| CN | 201112641 Y | 9/2008 |
| JP | 2013051409 A | 3/2013 |
| TW | M564840 U | 8/2018 |
| TW | 201925965 A | 7/2019 |

* cited by examiner

*Primary Examiner* — Anita M King
(74) *Attorney, Agent, or Firm* — CKC & Partners Co., LLC

(57) ABSTRACT

A fixing device includes a substrate, a slot, a fixing bracket. The slot is disposed on the substrate, and a first end of an expansion unit is inserted in the slot. The fixing bracket is disposed on the substrate, in which the fixing bracket includes a force receiving upper portion and a supporting lower portion. An accommodating space is defined between the force receiving upper portion and the supporting lower portion. When a force is applied to or released from the force receiving upper portion, the force receiving upper portion elastically deforms or elastically recovers. Therefore, the fixing bracket switches between an open state and a fixing state for enabling the accommodating space to selectively accommodate a second end of the expansion unit.

12 Claims, 6 Drawing Sheets

FIXING DEVICE

CROSS-REFERENCE TO RELATED APPLICATION

This application claims priority to China Application Serial Number 202110275779.8, filed Mar. 15, 2021, which is herein incorporated by reference in its entirety.

BACKGROUND

Field of Invention

The present invention is related to a fixing device. More specifically, the fixing device is used to fix an expansion unit.

Description of Related Art

Expansion units, such as graphic card and solid-state drive, can provide varieties of functions to a computer. The expansion units are usually locked and fixed to the computer. Nevertheless, the space in the computer is small, which is not convenient to move the expansion unit in or out of the computer by hands.

Therefore, private companies and academic institutions have invested a considerable amount of money, resources, and time to research fixing device, so as to improve the various characteristics thereof.

SUMMARY

The present invention provides a fixing device includes a substrate, a slot, and a fixing bracket. The slot is disposed on the substrate, and a first end of an expansion unit is inserted in the slot. The fixing bracket is disposed on the substrate, in which the fixing bracket includes a force receiving upper portion and a supporting lower portion. An accommodating space is defined between the force receiving upper portion and the supporting lower portion, the accommodating space is configured for accommodating a second end of the expansion unit. When a force is applied to or released from the force receiving upper portion, the force receiving upper portion elastically deforms or elastically recovers. Therefore, the fixing bracket switches between an open state and a fixing state for enabling the accommodating space to selectively accommodate a second end of the expansion unit.

In some embodiments of the present invention, the force receiving upper portion comprises a sloping surface facing the slot, and the sloping surface is configured for receiving the force generated from the expansion unit, such that the fixing bracket elastically deforms and switches to the open state.

In some embodiments of the present invention, when the second end passes through the force receiving upper portion and is located at the accommodating space, the force applied to the force receiving upper portion from the second end is released, such that the fixing bracket elastically recovers and switches to the fixing state.

In some embodiments of the present invention, the force receiving upper portion comprises a U-shaped bottom surface.

In some embodiments of the present invention, the supporting lower portion comprises a U-shaped top surface.

In some embodiments of the present invention, the force receiving upper portion comprises a convex surface facing the slot, and the convex surface is configured for receiving the force generated from the expansion unit, such that the fixing bracket elastically deforms and switches to the open state.

In some embodiments of the present invention, the fixing bracket includes a horizontal slit disposed between the force receiving upper portion and the supporting lower portion.

In some embodiments of the present invention, the fixing bracket is a continuous piece of material.

In some embodiments of the present invention, the fixing bracket includes a leg fixed to the substrate and electrically connected to a grounding line of the substrate.

In some embodiments of the present invention, the fixing device includes an elastic portion configured for pushing the expansion unit in the accommodating space, such that the expansion unit stably contacts the force receiving upper portion or the supporting lower portion.

In embodiments of the present invention, a fixing device includes a fixing bracket to replace traditional fixing and locking means, so as to save the cost thereof. Moreover, the elastic fixing bracket is configured for fixing an expansion unit such as solid-state disk, and thus users can open the fixing bracket easily due to the elasticity thereof, so as to save time on fixing and detaching the expansion unit. In summary, the fixing device which can replace traditional fixing and locking means is rather competitive, and thus plenty of time and cost can be saved.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
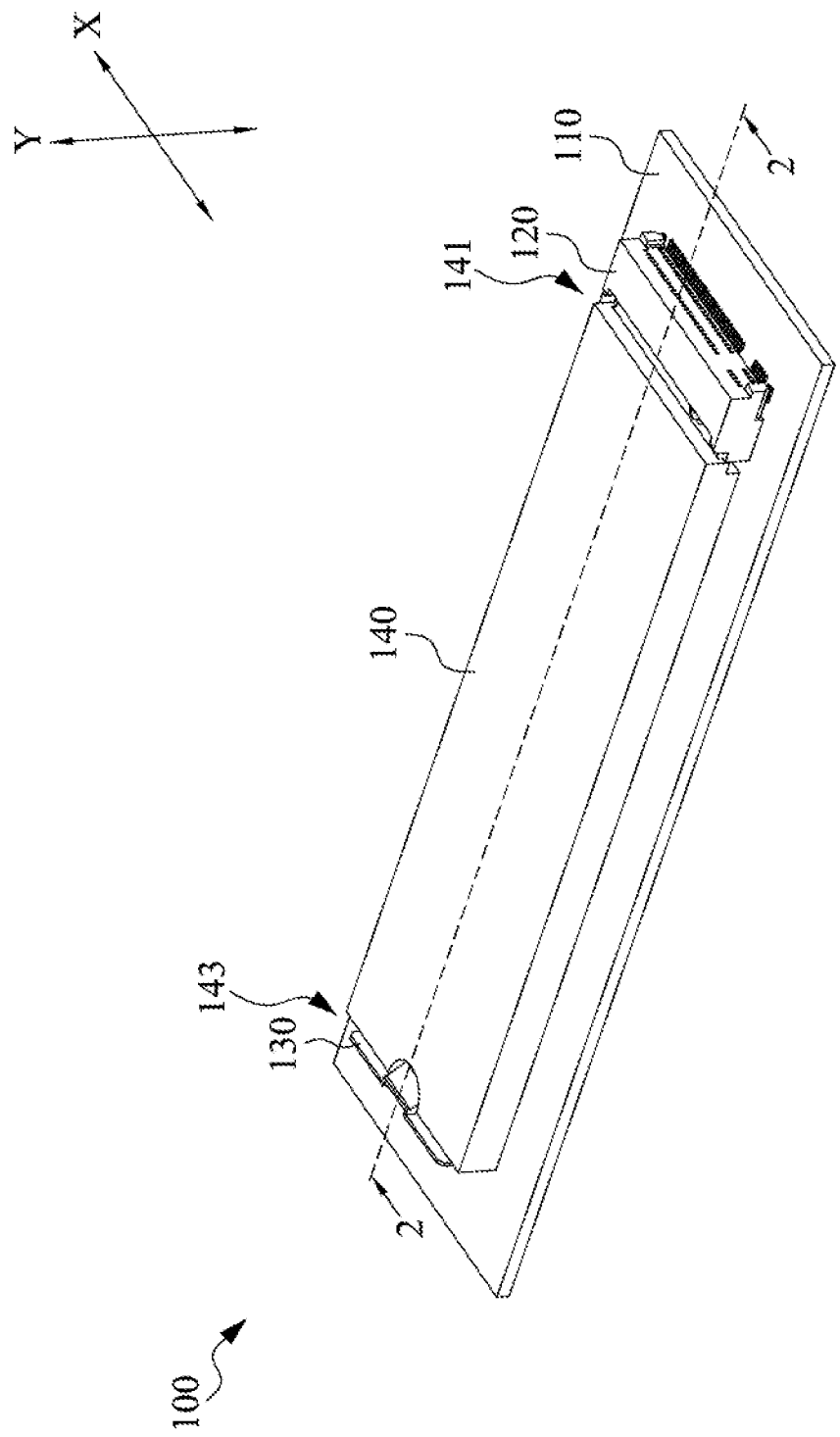
FIG. 1 illustrates a schematic view of a fixing device in accordance with some embodiments of the present invention.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1. FIG. 1 illustrates a schematic view of a fixing device 100. In some embodiments of the present invention, the fixing device 100 includes a substrate 110, a slot 120, and a fixing bracket 130. The slot 120 is disposed on the substrate 110, and the fixing bracket 130 is also disposed on the substrate 110. In addition, an end of an expansion unit 140 is inserted in the slot 120, and another end of the expansion unit 140 can be selectively clamped and fixed by the fixing bracket 130. In addition, the fixing bracket 130 can efficiently switches between an open state and a fixing state, so as to efficiently clamp or detach the expansion unit 140. The methods to clamp and detach the fixing device 100 and other details are described below.

Figure 2:
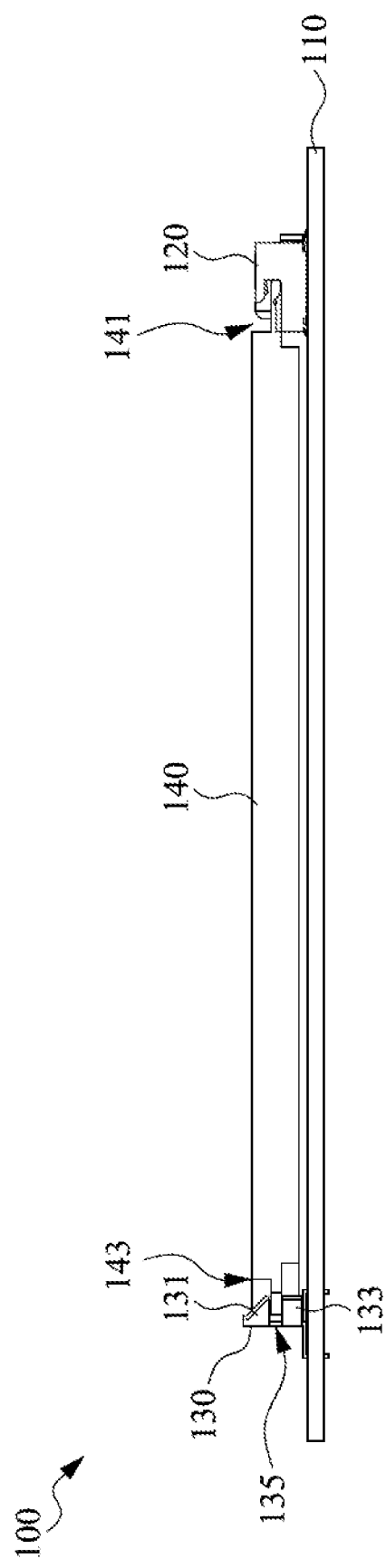
FIG. 2 illustrates a cross-section view of the fixing device taken from a line 2-2 in FIG. 1.
Figure 3:
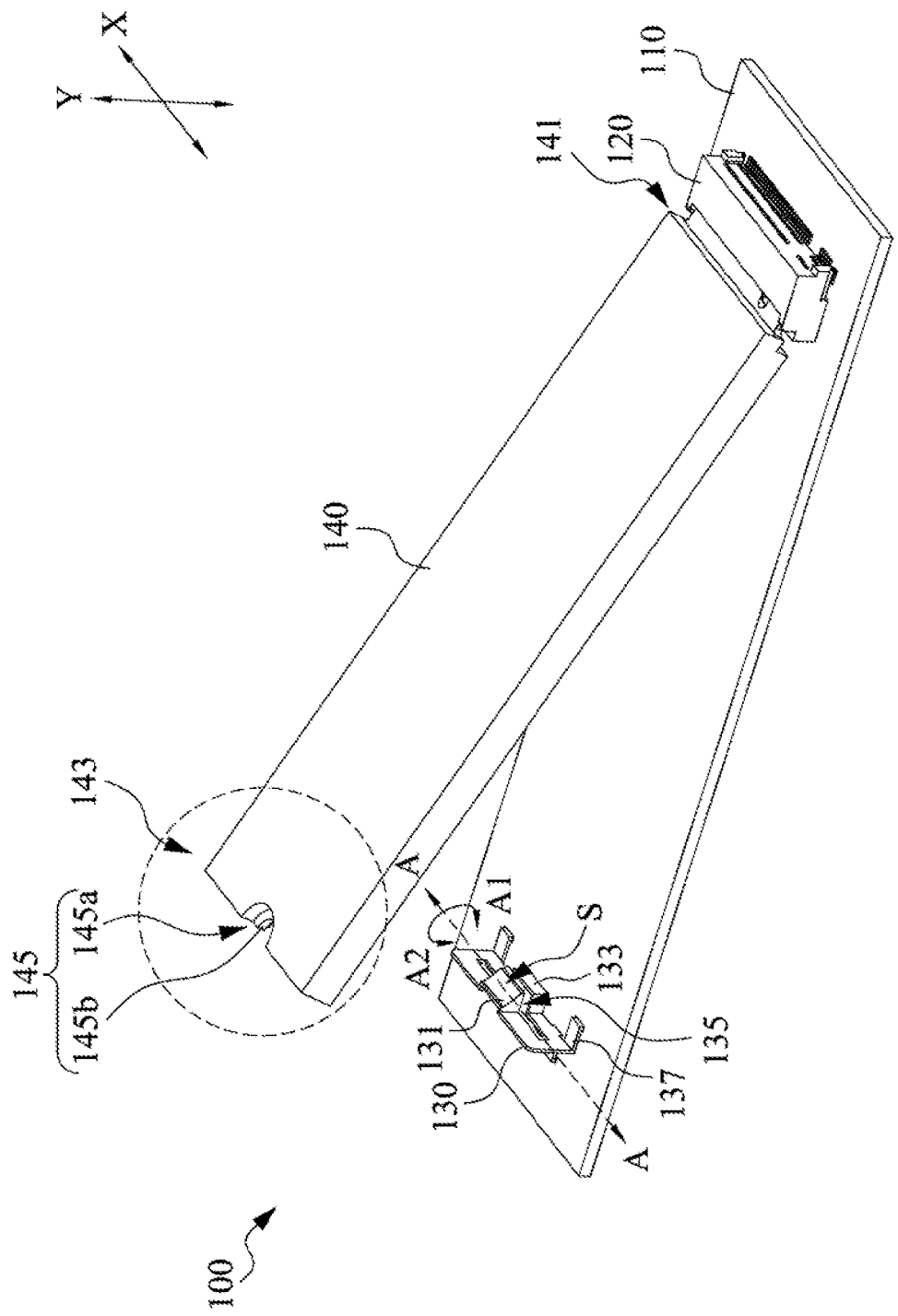
FIG. 3 illustrates a schematic view of a fixing device in accordance with some embodiments of the present invention.
Figure 4:
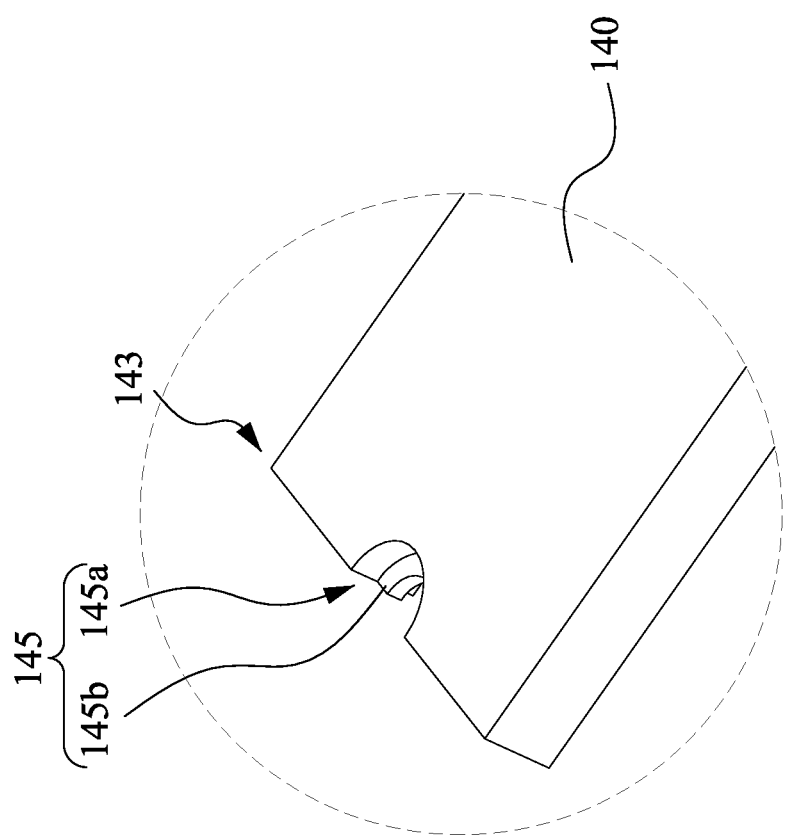
FIG. 4 illustrate an enlargement diagram of the fixing device in FIG. 3.
Figure 5:
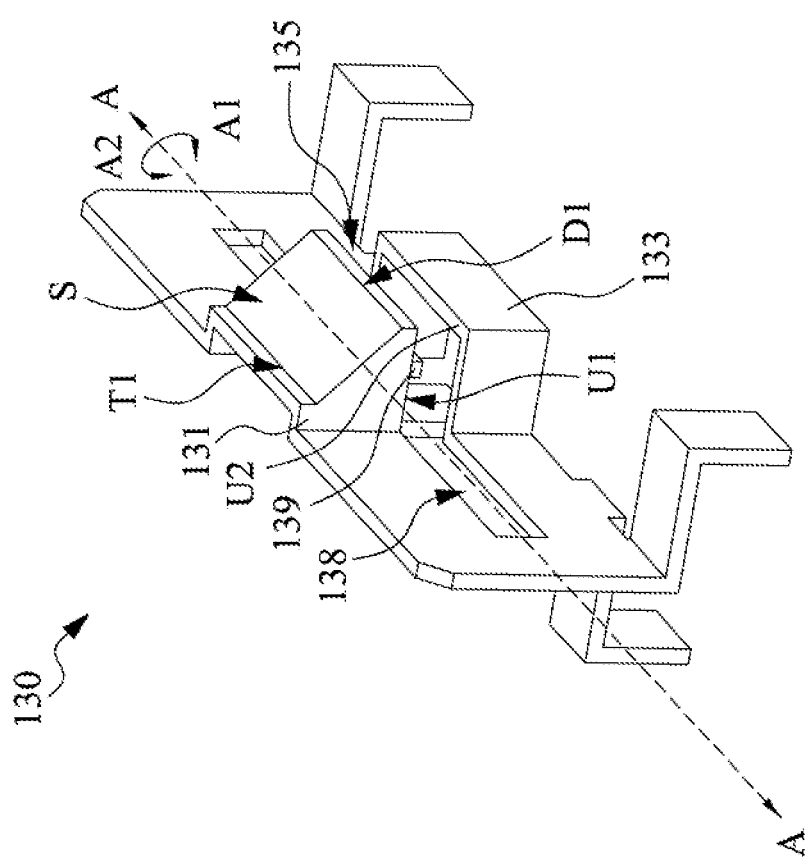
FIG. 5 illustrates a schematic view in accordance with some embodiments of the present invention.

Reference is made to FIGS. 1-5. FIG. 2 illustrates a cross-section view of the expansion unit 140 fixed by the fixing device 100 taken from line 2-2 in FIG. 1. FIG. 3 illustrates a schematic view of the fixing device 100, and the expansion unit 140 is not fixed to the fixing bracket 130. FIG. 4 illustrates an enlargement diagram of the partial expansion unit 140. FIG. 5 illustrates a schematic view of the fixing bracket 130. In some embodiments of the present invention, the fixing bracket 130 includes a force receiving upper portion 131, the supporting lower portion 133, and the accommodating space 135, and the accommodating space 135 is defined between force receiving upper portion 131 and the supporting lower portion 133. When a force is applied to or released from the force receiving upper portion 131, the force receiving upper portion elastically deforms or elastically recover, such that the fixing bracket 130 is able to switch between the open state and the fixing state. Moreover, when the force is applied to the force receiving upper portion 131, the force receiving upper portion can rotates forward in a rotation direction A1 or rotates backward in a rotation direction A2 around an axial direction A. Therefore, the expansion unit 140 can be easily inserted in or taken out of the accommodating space 135. The present invention is not limited in this respect.

Specifically, the substrate 110 can be a printed circuit board (PCB), such as single layer PCB and multi-layer PCB, and the present invention is not limited in this respect. Moreover, the slot 120 can be an insertion slot of a connector such as an insertion slot of a plug-in connector. In some embodiments of the present invention, the fixing bracket 130 is made of beryllium copper which is conductive and elastic. When the force is applied to or released from the force receiving upper portion 131 of the fixing bracket 130, the fixing bracket 130 elastically deforms or elastically recovers. The fixing bracket 130 can be a continuous piece of material, and the present invention is not limited in this respect. In some embodiments of the present invention, the fixing bracket 130 is made of elastic polymer material.

Moreover, the expansion unit 140 can provide additional functions, and the expansion unit 140 can include a solid-state disk or a graphic card. For instance, the expansion unit 140 uses M.2 interface Peripheral Component Interconnect Express (PCIE), which is a specification for internally mounted computer expansion cards and associated connectors. In some embodiments of the present invention, the expansion unit 140 can use mini-Peripheral Component Interconnect standard or mini-Serial Advanced Technology Attachment. Moreover, the expansion unit 140 can include a solid-state disk and a wireless communication module to provide variety of function, and the wireless communication module can include Wi-Fi module, blue tooth module, global positioning system module, or near-field communication module. The present invention is not limited in this respect.

In some embodiments of the present invention, the expansion unit 140 includes a first end 141 and a corresponding second end 143, in which the first end 141 can be inserted into the slot 120, and the second end 143 can be selectively fixed to the accommodating space 135. The first end 141 and the second end 143 can respectively be a front end and a rear end of the expansion unit 140, and the expansion unit 140 further includes a fixing structure 145. Moreover, the snapping structure 145 is disposed at the second end 143 such as the rear end of the expansion unit 140, and thus the snapping structure 145 can be received between the force receiving upper portion 131 and the supporting lower portion 133 and fixed at the accommodating space 135. In some embodiments of the present invention, the snapping structure 145 includes a curved recess 145a and a snapping rib 145b, and the snapping rib 145b is located in the curved recess 145a and extends along a concave surface of the curved recess 145a. For instance, the concave surface is vertical to a horizontal direction X, and the snapping rib 145b extends along the concave surface in the horizontal direction X. When the snapping structure 145 is located at the accommodating space 135, the force receiving upper portion 131 and the supporting lower portion 133 limit the snapping rib 145b in a vertical direction Y. Moreover, the force receiving upper portion 131 and the supporting lower portion 133 also contact and limit the concave surface of the curved recess 145a in the horizontal direction X, thereby stably fixing the expansion unit 140 to the slot 120 and the fixing bracket 130.

In some embodiments of the present invention, the force receiving upper portion 131 has a sloping surface S facing the slot 120, and the sloping surface S has a top portion T1 farther from the slot 120 than a bottom portion D1 of the sloping surface S. When the second end 143 of the expansion unit 140 applies a force such as pressure imposed from the snapping rib 145b of the snapping structure 145 to the sloping surface S, the fixing bracket 130 elastically deforms and drives the force receiving upper portion 131 of the fixing bracket 130 to rotate along a rotation direction A1 and switching to the open state. In addition, users can directly push the force receiving upper portion 131, so as to drive the force receiving upper portion 131 to bend along a rotation direction A2 and switches to the open state. Therefore, the second end 143 of the expansion unit 140 can be easily removed from the fixing bracket 130 in the vertical direction Y. Moreover, the second end 143 can push the force receiving upper portion 131 to move downward and then pass through the force receiving upper portion 131 to arrive at the accommodating space 135, and the second end 143 releases the force applied to the force receiving upper portion 131, such that the fixing bracket 130 elastically recovers and switches to the fixing state. Therefore, the force receiving upper portion 131 and the supporting lower portion 133 of the fixing bracket 130 collectively clamp the expansion unit 140. The present invention is not limited in this respect.

In some embodiments of the present invention, the force receiving upper portion 131 includes a U-shaped bottom surface U1, and the supporting lower portion 133 includes a U-shaped top surface U2. The U-shaped bottom surface U1 of the force receiving upper portion 131 and the U-shaped top surface U2 of the supporting lower portion 133 can be manufactured from a copper plate. Therefore, the fixing bracket 130 can be a continuous piece of material. Moreover, the fixing bracket 130 includes a horizontal slit 138 extending along the axial direction A, and the horizontal slit 138 is disposed between the force receiving upper portion 131 and the supporting lower portion 133. The horizontal slit 138 can be formed by performing a machining process. When the force is applied to the force receiving upper portion 131 of the fixing bracket 130, the fixing bracket 130 bends along the horizontal slit 138 in the rotation direction A1 or the rotation direction A2. Moreover, the machining process can be performed to a copper alloy plate, and then a bending process or other manufacturing processes can be performed to the copper alloy plate, so as to form the force receiving upper portion 131 and the supporting lower portion 133. The steps of the aforementioned processes can be adjusted or replaced, and the present invention is not limited in this respect.

In some embodiments of the present invention, the fixing bracket 130 is made of a conductive material, and the fixing bracket 130 has one or more L-shaped legs 137. For instance, the fixing bracket 130 includes four legs 137, in which two of the four legs 137 are located at a front side of the fixing bracket 130, and another two of the four legs 137 are located at a rear side of the fixing bracket 130. The legs 137 are fixed in the substrate 110 and have grounding function. Moreover, the legs 137 are partially in the substrate 110 and pass through the substrate 110, and the legs 137 are electrically connected to a grounding line of the substrate 110, so as to provide the grounding function. In some embodiments of the present invention, the snapping rib 145b of the expansion unit 140 is made of conductive material, and the snapping rib 145b is electrically connected to an interior circuit of the expansion unit 140. When the snapping rib 145b is in contact with and electrically connected to the fixing bracket 130, the legs 137 provide the grounding function to the expansion unit 140. The present invention is not limited in this respect.

In some embodiments of the present invention, the fixing bracket 130 further includes an elastic portion 139, and the elastic portion 139 is configured for pressuring the expansion unit 140 which is fixed in the accommodating space 135. Therefore, the expansion unit 140 is stably in contact with the force receiving upper portion 131 or the supporting lower portion 133. In FIG. 5, the elastic portion 139 is disposed on U-shaped bottom surface U1 of the force receiving upper portion 131. When the force receiving upper portion 131 and the supporting lower portion 133 collectively clamp the expansion unit 140, the elastic portion 139 elastically deforms and continuously applies an elastic force to the expansion unit 140, such that the expansion unit 140 can stably contact the U-shaped top surface U2 of the supporting lower portion 133 for improving the stability thereof. Moreover, the elastic portion 139 can be disposed on an interior sidewall or an outer sidewall of the force receiving upper portion 131, and the elastic portion 139 can protrude downward from the U-shaped bottom surface U1. The present invention is not limited in this respect. In some embodiments of the present invention, the elastic portion 139 can be square, trapezoidal, cylindrical, or in other suitable shapes, and the elastic portion 139 can also be a spring or an elastic piece. The present invention is not limited in this respect.

In some embodiments of the present invention, the elastic portion 139 is disposed on the U-shaped top surface U2 of the supporting lower portion 133. When the force receiving upper portion 131 and the supporting lower portion 133 collectively clamp and fix the expansion unit 140, the elastic portion 139 plastically deforms and continuously applies a plastic force to the expansion unit 140, and thus the expansion unit 140 can stably contact the U-shaped bottom surface U1 of the force receiving upper portion 131. Moreover, the elastic portion 139 can be disposed on an interior sidewall or an outer sidewall of the supporting lower portion 133, and the elastic portion 139 can protrude upward from the U-shaped top surface U2. The present invention is not limited in this respect.

Figure 6:
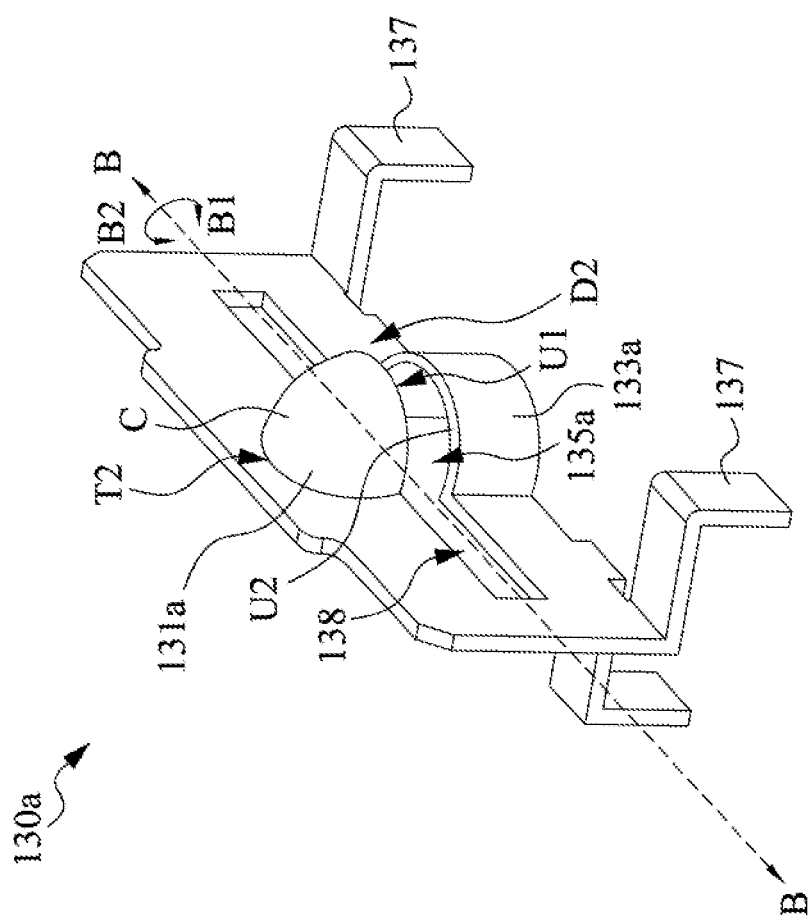
FIG. 6 illustrates a schematic view in accordance with some embodiments of the present invention.

Reference is made to FIGS. 1-4 and FIG. 6. FIG. 6 illustrates a schematic view of a fixing bracket 130a in accordance with some embodiments of the present invention, and the fixing bracket 130a can replace the fixing bracket 130 in FIG. 1 to FIG. 4. Moreover, the fixing bracket 130a and the fixing bracket 130 are substantially the same, but the force receiving upper portion 131a and the supporting lower portion 133a of the fixing bracket 130a are different from the fixing bracket 130. The force receiving upper portion 131a is a quarter-sphere cap, and thus the force receiving upper portion 131a has a convex surface C which faces the slot 120. The convex surface C has a top portion T2 farther from the slot 120 than a bottom portion D2 of the convex surface C, and the convex surface C can receive the force from the second end 143 of the expansion unit 140, such that the fixing bracket 130a can bend along an axial direction B and switches to the open state. In addition, the expansion unit 140 can applies the force to the fixing bracket 130a from above, and the force receiving upper portion 131a of the fixing bracket 130a can elastically deform and rotate along a rotation direction B1. Therefore, the fixing bracket 130a switches to the open state, and thus the expansion unit 140 can be inserted into the accommodating space 135a. In addition, users can directly apply a force to the force receiving upper portion 131a, and then the force receiving upper portion 131a bend in a rotation direction B2 and switches to the open state, such that the expansion unit 140 can removed out from the accommodating space 135a of the fixing bracket 130a. The present invention is not limited in this respect.

In embodiments of the present invention, a fixing device includes a fixing bracket to replace traditional fixing and locking means, so as to save the cost thereof. Moreover, the elastic fixing bracket is configured for fixing an expansion unit such as solid-state disk, and thus users can open the fixing bracket easily due to the elasticity thereof, so as to save time on fixing and detaching the expansion unit. In summary, the fixing device which can replace traditional fixing and locking means is rather competitive, and thus plenty of time and cost can be saved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A fixing device comprising:
a substrate;
a slot disposed on the substrate, and a first end of an expansion unit is inserted in the slot; and
a fixing bracket disposed on the substrate, wherein the fixing bracket includes a force receiving upper portion and a supporting lower portion, an accommodating space is defined between the force receiving upper portion and the supporting lower portion, when a force is applied to or released from the force receiving upper portion, the force receiving upper portion elastically deforms or elastically recovers, such that the fixing bracket switches between an open state and a fixing state for enabling the accommodating space to selectively accommodate a second end of the expansion unit, wherein the fixing bracket comprises a horizontal slit disposed between the force receiving upper portion and the supporting lower portion, and the fixing bracket comprises a leg fixed to the substrate and electrically connected to a grounding line of the substrate.

2. The fixing device of claim 1, wherein the force receiving upper portion comprises a sloping surface facing the slot, the sloping surface is configured for receiving the force generated from the expansion unit, such that the fixing bracket elastically deforms and switches to the open state.

3. The fixing device of claim 2, wherein when the second end passes through the force receiving upper portion and is located at the accommodating space, the force applied to the force receiving upper portion from the second end is released, such that the fixing bracket elastically recovers and switches to the fixing state.

4. The fixing device of claim 2, wherein the force receiving upper portion comprises a U-shaped bottom surface.

5. The fixing device of claim 2, wherein the supporting lower portion comprises a U-shaped top surface.

6. The fixing device of claim 1, wherein the force receiving upper portion comprises a convex surface facing the slot, the convex surface is configured for receiving the force generated from the expansion unit, such that the fixing bracket elastically deforms and switches to the open state.

7. The fixing device of claim 6, wherein when the second end passes through the force receiving upper portion and is located at the accommodating space, the force applied to the force receiving upper portion from the second end is released, such that the fixing bracket elastically recovers and switches to the fixing state.

8. The fixing device of claim 6, wherein the force receiving upper portion comprises a U-shaped bottom surface.

9. The fixing device of claim 6, wherein the supporting lower portion comprises a U-shaped top surface.

10. The fixing device of claim 1, wherein the fixing bracket is a continuous piece of material.

11. The fixing device of claim 1, wherein the leg is L-shaped.

12. The fixing device of claim 1 further comprising an elastic portion configured for pushing the expansion unit in the accommodating space, such that the expansion unit stably contacts the force receiving upper portion or the supporting lower portion.

\* \* \* \* \*